US 6,571,690 B1

United States Patent
Hsu

(10) Patent No.: US 6,571,690 B1
(45) Date of Patent: Jun. 3, 2003

(54) HOME YOGURT MAKING MACHINE BY DIRECTLY INCUBATING MILK BOTTLE THEREIN

(76) Inventor: Tsang-Hung Hsu, 14 Floor, No. 632, Ta-Yu Road, Taoyuan City (TW)

( * ) Notice: Subject to any disclaimer, the term of this patent is extended or adjusted under 35 U.S.C. 154(b) by 0 days.

(21) Appl. No.: 10/274,939

(22) Filed: Oct. 17, 2002

(51) Int. Cl.⁷ .................. A47J 43/044; A23G 9/00; A23G 9/12; A23L 1/00

(52) U.S. Cl. .................. 99/453; 99/452; 99/455; 99/483; 219/430; 219/441

(58) Field of Search .................. 99/452–455, 456–461, 99/467, 468, 483, 323; 126/273.5; 165/47; 141/1, 85; 366/213, 339, 144–146; 219/430, 530, 441, 387, 771, 778–780; 435/252.1, 800, 286.7, 304.1; 422/40, 276, 265; 426/34, 43, 582

(56) References Cited

U.S. PATENT DOCUMENTS

| | | | | | |
|---|---|---|---|---|---|
| 3,975,239 | A | * | 8/1976 | Stamer | 435/800 X |
| 4,163,472 | A | * | 8/1979 | Taylor | 99/453 |
| 4,202,258 | A | * | 5/1980 | Castanis | 99/455 |
| 4,870,896 | A | * | 10/1989 | Asahina | 99/348 |
| 4,903,589 | A | * | 2/1990 | Aoyama | 99/468 |
| 5,054,383 | A | * | 10/1991 | Cho | 99/327 |
| 5,076,425 | A | * | 12/1991 | Plone | 99/323 |
| 5,979,300 | A | * | 11/1999 | Donovan | 99/323 |
| 6,213,007 | B1 | * | 4/2001 | Lande | 99/453 |

* cited by examiner

Primary Examiner—Timothy F. Simone

(57) ABSTRACT

A home yogurt making machine includes: a housing, an inner incubator thermally insulatively mounted in the housing, and a heating device having a positive-temperature-coefficient (PTC) semiconductor heating element mounted on a bottom of the inner incubator for smoothly heating the incubator, with the inner incubator having an internal chamber for directly storing a milk bottle or a soybean milk bottle in the incubator for conveniently forming yogurt at home.

11 Claims, 3 Drawing Sheets

HOME YOGURT MAKING MACHINE BY DIRECTLY INCUBATING MILK BOTTLE THEREIN

BACKGROUND OF THE INVENTION

When preparing yogurt at home, a conventional yogurt making machine may be provided for making the yogurt. However, it has the following drawbacks:

1. The bowl or container of the yogurt making machine should be cleaned or sterilized by boiling water before filling milk therein, causing inconvenience for the user.
2. A milk bottle such as bought from a supermarket can not be directly incubated in the yogurt making machine and should be opened to decant the milk from the bottle into the bowl of the yogurt making machine for forming the yogurt by adding bacteria into the milk, still requiring inconvenient procedures when making the yogurt.
3. The conventional heating coil may have phenomena of over-heating or unhomogeneous heating, thereby possibly deteriorating the flavor or quality of yogurt as produced.

The present inventor has found the drawbacks of conventional home yogurt making machine and invented the present home yogurt making machine by directly incubating a milk bottle in the machine.

SUMMARY OF THE INVENTION

The object of the present invention is to provide a home yogurt making machine including: a housing, an inner incubator thermally insulatively mounted in the housing, and a heating device having a positive-temperature-coefficient (PTC) semiconductor heating element mounted on a bottom of the inner incubator for smoothly heating the incubator, with the inner incubator having an internal chamber for directly storing a milk bottle or a soybean milk bottle in the incubator for conveniently forming yogurt at home.

DETAILED DESCRIPTION

Figure 1:
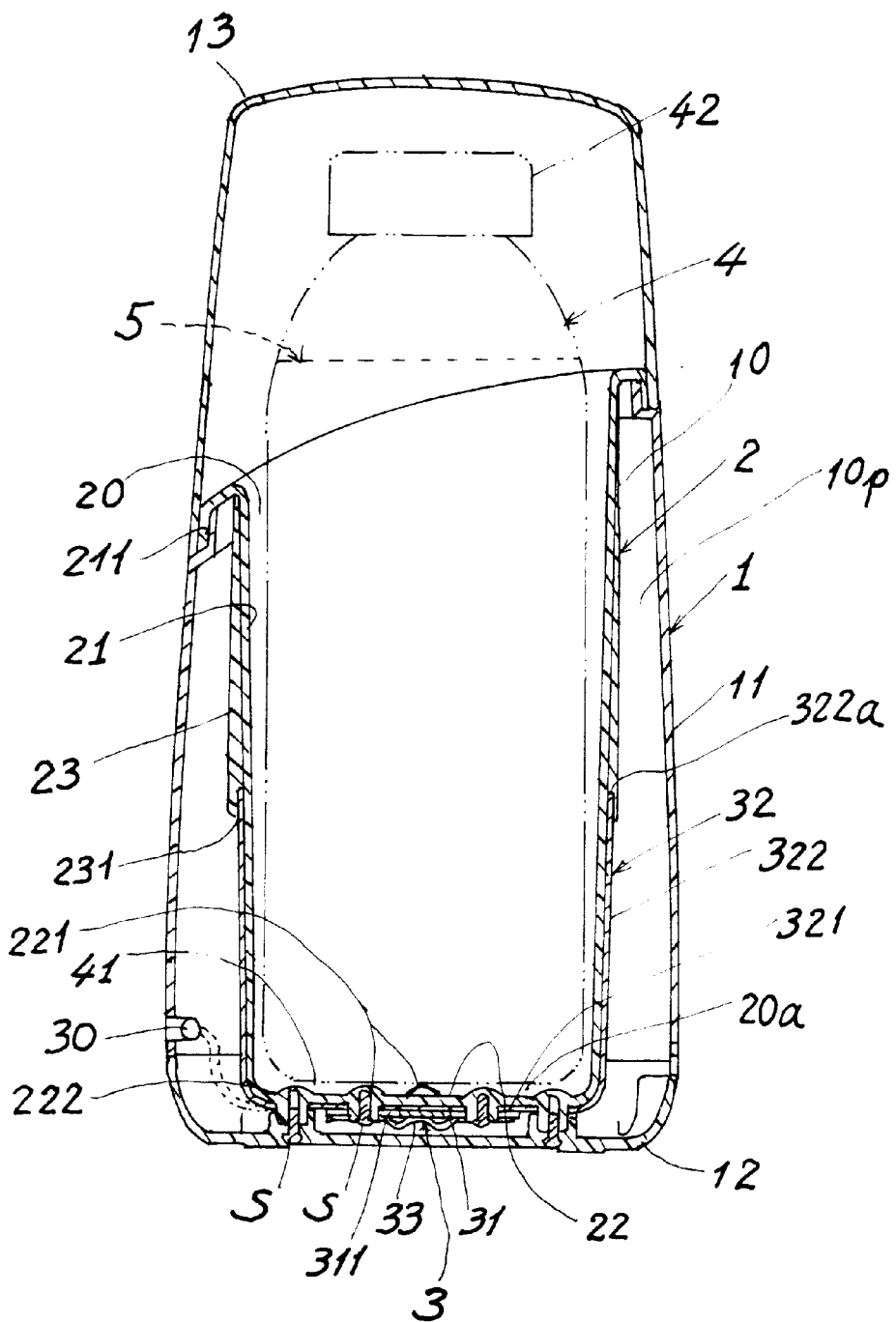
FIG. 1 is a sectional drawing of the present invention.
Figure 2:
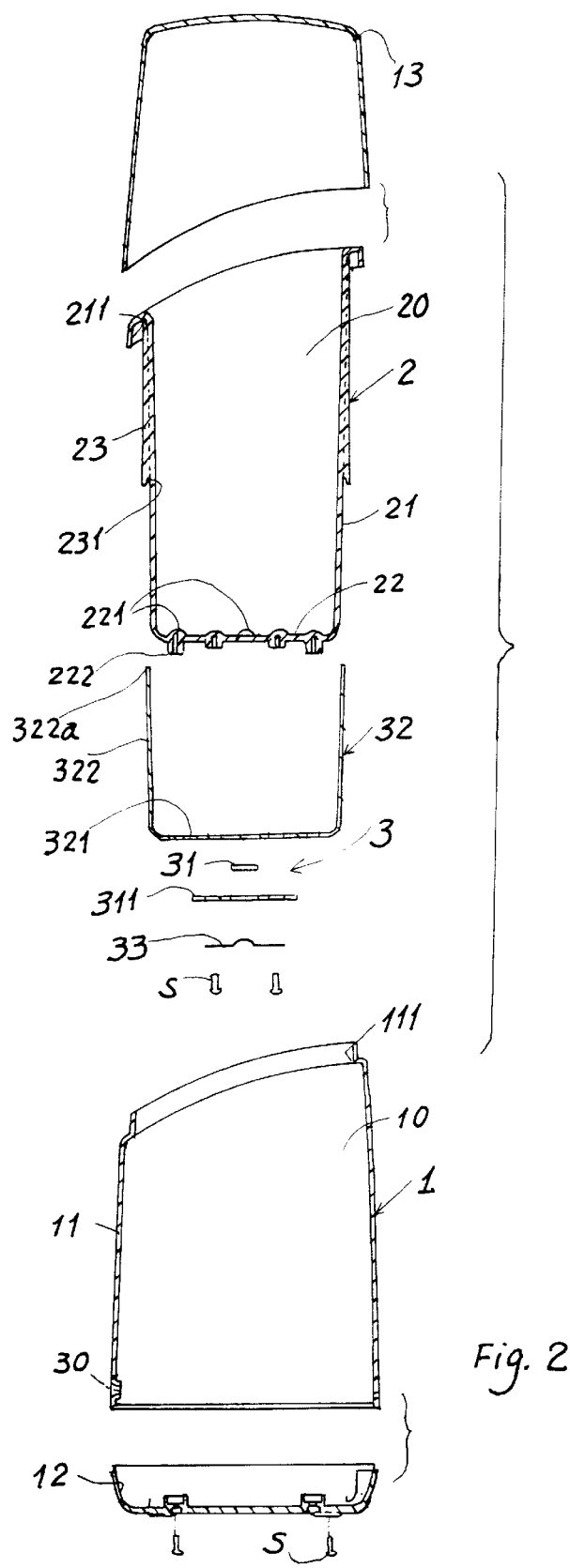
FIG. 2 is a sectional drawing showing the brokendown elements for forming the present invention.
Figure 3:
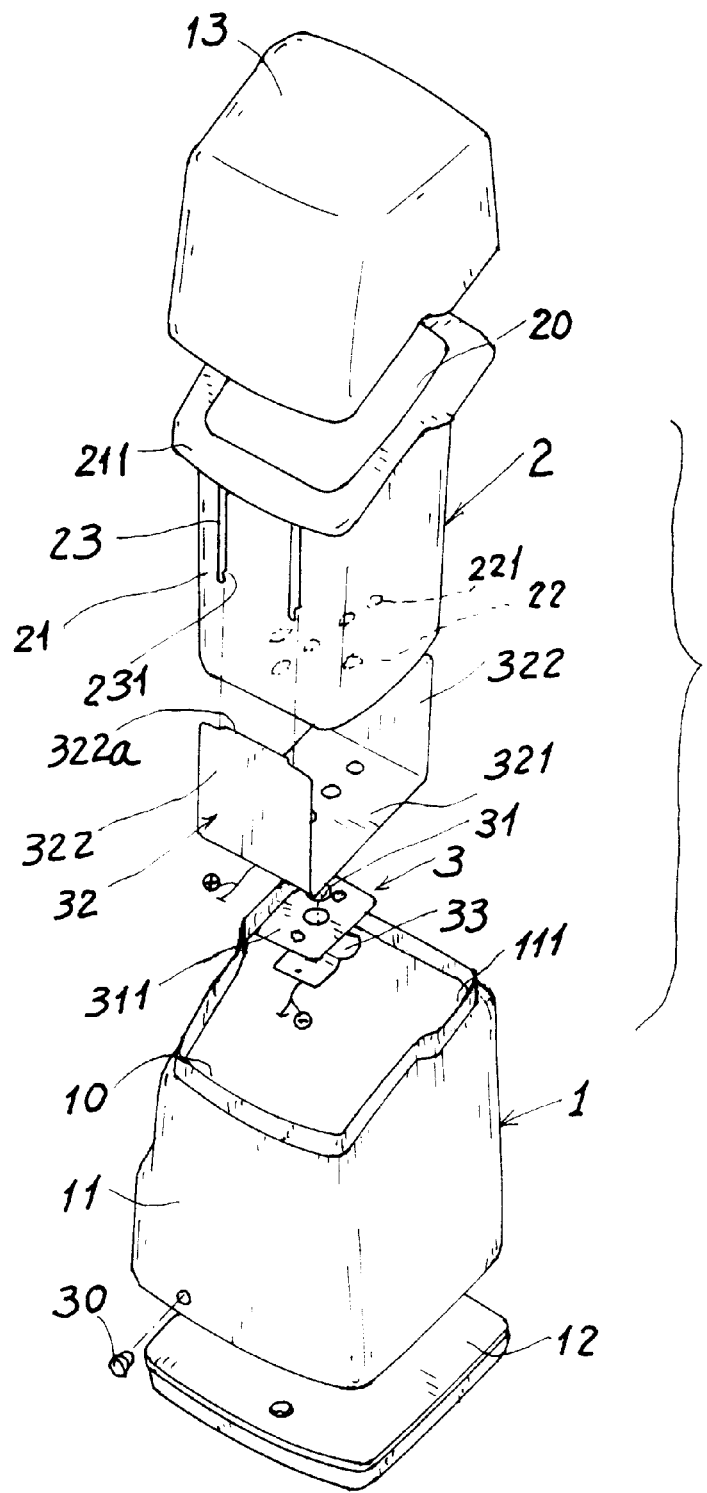
FIG. 3 is an exploded view of the present invention.

As shown in the drawing figures, the home yogurt making machine of the present invention comprises: a housing 1, an inner incubator 2 secured in the housing 1 for storing, inserting or putting a milk bottle 4 having milk filled therein in the incubator 2, and a heating means 3 formed in the housing 1 and disposed about the incubator 2 for heating or warming the milk bottle 4 as stored in the incubator 2. The design shapes of the elements of the present invention are not limited.

The housing 1 includes: an outer wall 11 circumferentially defining an interior 10 therein and having a top opening 111 on its top edge portion, a bottom cover 12 secured on a bottom of the outer wall 11, and a top cover 13 covering the top opening 111 of the outer wall 11.

The inner incubator 2 includes: an inner wall (or incubator wall) 21 circumferentially defining an internal chamber 20 within the wall 21 for storing, inserting or putting a milk bottle (or soybean milk bottle) 4 into the internal chamber 20; a bottom end plate 22 secured on a bottom of the wall 21 for closing a bottom opening of the wall 21; a top rim 211 defining a top opening of the wall 21 and secured on a top edge portion of the outer wall 11 of the housing 1; and a plurality of protrusions 221 formed on the bottom end plate 22 to form "void (or air) space" 20a between the bottom end plate 22 and a bottom 41 of the milk bottle 4 when stored in the internal chamber 20 in the incubator 2 as shown in FIG. 1.

The protrusion 221 formed on the bottom end plate 22 may also serve as a screw socket 222 when securing the incubator 2 with the bottom cover 12 or for securing the heating means 3 on the bottom end plate 22 of the incubator 2 (FIG. 1) by inserting screws S through the screw sockets 222.

The inner incubator 2 is formed with a plurality of ribs 23 on the wall 21, having a recess 231 formed in a lower portion of each rib 23 for embedding a heat conducting member 32 of the heating means 3 into each recess 231 formed in each rib 23 for snugly disposing (or contacting) the heat conducting member 32 about (or with) the wall 21 of the incubator 2 for warming or heating the incubator 2 and the milk bottle 4 as stored in the incubator 2.

The heating means 3 includes: a positive-temperature-coefficient (PTC) semiconductor heating element 31 embedded on a carrier plate 311, a heat conducting member 32 secured to the bottom end plate 22 of the inner incubator 2 and a resilient backing plate 33 cooperating with the heat conducting member 32 for sandwiching the PTC semiconductor heating element 31 (mounted on said carrier plate 311) in between the heat conducting member 32 and the resilient backing plate 33, with both the heat conducting member 32 and the resilient backing plate 33 secured to the bottom end plate 22 of the inner incubator 2 by screws S.

The heat conducting member 32 includes: a bottom plate 321 secured to the bottom of the inner incubator 2 and a plurality of (or two) side-wall plates 322 protruding upwardly from the bottom plate 321 to be disposed about the wall 21 of the incubator 2 with a top end portion 322a of each side-wall plate 322 engaged with a recess 231 recessed in each rib 23 formed on the wall 21 of the incubator 2 for closely surrounding the side-wall plates 322 about the wall 21 of the incubator 2; with the bottom plate 321, the PTC semiconductor heating elements 31, and the resilient backing plate 33 cooperatively fastened to the bottom of the incubatory 2 by screws S.

The PTC semiconductor heating element 31 is sandwiched in between the bottom plate 321 of the heat conducting member 32 and the resilient backing plate 33; having the heat conducting plate 32 made of electrically conductive material and electrically connected to a first polarity (such as positive pole) of a power source and having the resilient backing plate 33 made of electrically conductive material and electrically connected to a second polarity (such as negative pole) of the power source, whereby upon powering of the heat conducting plate 32 and the backing plate 33 to actuate the heating element 31 to produce heat, the heat will be transferred through the heat conducting plate 32 (including the bottom plate 321 and the side-wall plates 322) for warming or heating the incubator 2 for thermally incubating or curdling the milk added with bacteria in the milk bottle 4 for making yogurt directly in the milk bottle.

The heating means 3 further includes a thermostat or temperature controller 30 electrically connected to the PTC semiconductor heating element 31 for controlling the incubation temperature for smoothly optimumly making the yogurt. The temperature controller 30 may be formed on the housing 1. The temperature controller 30 may also be provided with a lamp for indicating the normal power supply.

For making the yogurt, the milk bottle or soybean milk bottle 4 containing milk therein may be directly put into the internal chamber 20 in the incubator 2 and the cap 42 may be opened for adding bacteria into the milk for preparing a yogurt mix 5. The temperature is adjusted to an optimum incubation temperature by actuating the heating means 3.

The inner incubator 2 is thermally insulatively mounted within the housing 1 having a thermally insulating medium or lining (such as foam) 10*p* formed in between the wall 21 of the incubator 2 and an inside wall of the housing 1 to prevent heat loss from the incubator and well keep a constant temperature within the incubator 2 for smoothly incubating and making the yogurt.

For a small size incubator 2, the thermally insulating lining 10*p* may be eliminated to allow air to serve as the thermally insulating medium since air has poor heat conductivity.

The present invention is superior to a conventional home yogurt making machine with the following advantages:

1. The milk bottle 4 as bought from a supermarket can be directly put into the incubator for forming the yogurt without first decanting the milk into the yogurt making machine for incubation and then discharged from the machine when finished, thereby conveniently making the yogurt at home.
2. The PTC semiconductor heating element 31 is provided for obtaining a stable optimum incubation temperature without overheating the yogurt mix and without deteriorating the yogurt quality.
3. The bottom portion 22 of the incubator is formed with plural protrusions 221 to prevent a close contact of the bottle with the heating element 31 just secured to the bottom of the incubator 2 in order to prevent overheating of the milk adjacent to the bottom of incubator. While the side-wall plates 322 of the heat conducting member 32 may well transfer the heat upwardly from the bottom plate 321 and then circumferentially transfer the heat to the wall 21 of the incubator for homogeneously heating or warming the milk bottle 4 in a three-dimensional way. So, the flavour and quality of the yogurt thus formed will be more palatable.
4. The elements of the yogurt making machine of this invention can be easily assembled for operation or detached for maintenance. The construction of the machine is simple and the production cost is low.

The present invention may be modified without departing from the spirit and scope of the present invention.

I claim:

1. A home yogurt making machine comprising:
    a housing;
    an inner incubator thermally insulatively mounted in said housing and defining an internal chamber in said incubator for directly storing a milk bottle into said internal chamber for incubating a yogurt mix including the milk filled in the bottle and yogurt bacteria as added therein; and
    a heating means secured in said housing and circumferentially disposed about said inner incubator and having a positive-temperature-coefficient (PTC) semiconductor heating element for heating or warming the incubator and the milk bottle for forming yogurt directly in the milk bottle.

2. A home yogurt making machine according to claim 1, wherein said inner incubator includes: an incubator wall circumferentially defining said internal chamber within the incubator wall for storing, inserting or putting the milk bottle into the internal chamber to be heated by said heating means; a bottom end plate secured on a bottom of the incubator wall for closing a bottom opening of the incubator wall; a top rim defining a top opening of the incubator wall and secured on a top edge portion of an outer wall of the housing; and a plurality of protrusions formed on the bottom end plate to form air space between the bottom end plate and a bottom of the milk bottle when stored in the internal chamber in the incubator.

3. A home yogurt making machine according to claim 2, wherein said protrusion on the bottom end plate is formed with a screw socket in said protrusion for securing the incubator with a bottom cover of said housing and for securing the heating means to the bottom end plate of the incubator by inserting a screw through each said screw socket.

4. A home yogurt making machine according to claim 2, wherein said inner incubator is formed with a plurality of ribs on the incubator wall, having a recess formed in a lower portion of each said rib for embedding a heat conducting member of the heating means into each said recess formed in each said rib for snugly disposing the heat conducting member about the incubator wall of the incubator for warming or heating the incubator and the milk bottle as stored in the incubator.

5. A home yogurt making machine according to claim 2, wherein said heating means includes: a positive-temperature-coefficient (PTC) semiconductor heating element embedded on a carrier plate, a heat conducting member secured to the bottom end plate of the inner incubator and a resilient backing plate cooperating with said heat conducting member for sandwiching the PTC semiconductor heating element as fixed on said carrier plate in between the heat conducting member and the resilient backing plate, with both the heat conducting member and the resilient backing plate secured to the bottom end plate of the inner incubator.

6. A home yogurt making machine according to claim 5, wherein said heat conducting member includes: a bottom plate secured to the bottom of the inner incubator and a plurality of side-wall plates protruding upwardly from the bottom plate to be disposed about the incubator wall of the incubator with a top end portion of each said side-wall plate engaged with a recess recessed in a rib formed on the wall of the incubator for closely surrounding the side-wall plates about the wall of the incubator; with the bottom plate, the PTC semiconductor heating elements, and the resilient backing plate cooperatively fastened to a bottom of the incubator.

7. A home yogurt making machine according to claim 6, wherein said PTC semiconductor heating element is sandwiched in between the bottom plate of the heat conducting member and the resilient backing plate; having the heat conducting plate made of electrically conductive material and electrically connected to a first polarity of a power source, and having the resilient backing plate made of electrically conductive material and electrically connected to a second polarity of the power source, whereby upon powering of the heat conducting plate and the backing plate to actuate the heating element to produce heat, the heat will be transferred through the heat conducting plate for warming or heating the incubator for thermally incubating or curdling the milk added with bacteria in the milk bottle for making the yogurt directly in the milk bottle.

8. A home yogurt making machine according to claim 5, wherein said heating means further includes a temperature controller electrically connected to the PTC semiconductor heating element for controlling the incubation temperature for optimumly making the yogurt.

9. A home yogurt making machine according to claim 2, wherein said inner incubator is thermally insulatively mounted in the housing having a thermally insulating medium formed in between the incubator wall of the incubator and an inside wall of the housing to prevent heat loss from the incubator and to well keep a constant temperature within the incubator for smoothly incubating and making the yogurt.

10. A home yogurt making machine according to claim 9, wherein said thermally insulating medium is a lining including foam formed between the incubator wall and an inside wall of said housing.

11. A home yogurt making machine according to claim 9, wherein said thermally insulating medium is air.

* * * * *